United States Patent
Tsuzuki et al.

(10) Patent No.: US 9,921,302 B2
(45) Date of Patent: Mar. 20, 2018

(54) DETECTION SYSTEM

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Takeo Tsuzuki, Kariya (JP); Koichi Mizutani, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/506,413

(22) PCT Filed: Jul. 28, 2015

(86) PCT No.: PCT/JP2015/003760
§ 371 (c)(1),
(2) Date: Feb. 24, 2017

(87) PCT Pub. No.: WO2016/035243
PCT Pub. Date: Mar. 10, 2016

(65) Prior Publication Data
US 2017/0254888 A1 Sep. 7, 2017

(30) Foreign Application Priority Data
Sep. 1, 2014 (JP) .................. 2014-177098

(51) Int. Cl.
*G01S 15/00* (2006.01)
*G01S 7/526* (2006.01)
(Continued)

(52) U.S. Cl.
CPC ............ *G01S 7/526* (2013.01); *G01S 15/931* (2013.01); *G08G 1/166* (2013.01)

(58) Field of Classification Search
CPC ........ G01S 7/526; G01S 15/931; G08G 1/166
See application file for complete search history.

(56) References Cited

U.S. PATENT DOCUMENTS

2012/0277957 A1* 11/2012 Inoue .................... B60W 30/12
701/41

FOREIGN PATENT DOCUMENTS

JP   H04-250388 A    9/1992
JP   H11-304911 A   11/1999
(Continued)

*Primary Examiner* — Erin File
(74) *Attorney, Agent, or Firm* — Knobbe, Martens, Olson & Bear, LLP

(57) ABSTRACT

A detection system includes: a detection portion that has an output function outputting a detection wave toward surroundings of a vehicle, and a detection function detecting an object around the vehicle based on a reflected wave; a determination section that determines that the object is definitely present around the vehicle when a number of times of detection of the object by the detection function exceeds a predetermined number of times; a control section that causes operation of the detection function without operation of the output function when the vehicle travels at a predetermined speed or higher; and an adjustment section that adjusts and increases the predetermined number of times designated for the determination section when the object is detected by the detection function operated by the control section during traveling of the vehicle at the predetermined speed or higher.

5 Claims, 2 Drawing Sheets

(51) Int. Cl.
*G01S 15/93* (2006.01)
*G08G 1/16* (2006.01)

(56) References Cited

FOREIGN PATENT DOCUMENTS

| | | |
|---|---|---|
| JP | 2006-153801 | 6/2006 |
| JP | 2013-104689 A | 5/2013 |

* cited by examiner

DETECTION SYSTEM

CROSS REFERENCE TO RELATED APPLICATIONS

The present application is based on Japanese Patent Application No. 2014-177098 filed on Sep. 1, 2014, the disclosure of which is incorporated herein by reference.

TECHNICAL FIELD

The present disclosure relates to a detection system.

BACKGROUND ART

It has been progressing to develop a system that detects an obstacle around a vehicle by utilizing an ultrasonic wave or the like. For example, this type of system includes an ultrasonic sensor having a generation (output) function for generating an ultrasonic wave, and a reception (detection) function for receiving an ultrasonic wave, and disposed at multiple positions on a bumper of a vehicle. When the sensor receives an ultrasonic wave generated from the sensor, the sensor recognizes the received ultrasonic wave as a wave reflected on an object around the vehicle. In this case, the sensor calculates a distance to the object based on a time from generation to reception, and notifies a driver about the presence of the object when the calculated distance is a predetermined distance or shorter, for example.

A technology capable of reducing misdetection by an ultrasonic sensor may be important. For example, Patent Literature 1 identified below discloses an ultrasonic sensor that outputs an ultrasonic wave by oscillating an oscillator of the ultrasonic sensor at a frequency different from a resonant frequency of the oscillator, and determines that the ultrasonic sensor is in an abnormal condition when a frequency of a wave reception signal corresponds to the resonant frequency.

The inventors of the present invention have found following current circumstances. It has been pointed out that the foregoing system for detecting an obstacle around a vehicle causes misdetection by regarding a raindrop or the like falling on and adhering to the sensor as reception of a reflected wave in some cases. Raining or like events are possible and frequent phenomena, and therefore this type of misdetection considerably lowers reliability of the obstacle detection system. Accordingly, there has been a strong demand for a system capable of reducing this type of misdetection.

PRIOR ART LITERATURES

Patent Literature

Patent Literature 1: JP 2013-104689 A

SUMMARY OF INVENTION

It is an object of the present disclosure to provide a detection system detecting an object around a vehicle, and capable of reducing a possibility of misdetection caused by an effect such as a raindrop.

A detection system according to one aspect of the present disclosure includes: a detection portion that has an output function outputting a detection wave toward surroundings of a vehicle, and a detection function detecting an object around the vehicle based on a reflected wave which is the detection wave reflected on the object; a determination section that determines that the object is definitely present around the vehicle when a number of times of detection of the object by the detection function of the detection portion exceeds a predetermined number of times; a control section that causes operation of the detection function of the detection portion without operation of the output function of the detection portion when the vehicle travels at a predetermined speed or higher; and an adjustment section that adjusts and increases the predetermined number of times designated for the determination section when the object is detected by the detection function operated by the control section during traveling of the vehicle at the predetermined speed or higher.

The detection system according to the present disclosure increases the predetermined number of times designated for object detection determination around the vehicle when the detection function of the detection portion allowed to operate detects a raindrop or the like as an object during traveling of the vehicle at the predetermined speed or higher. It is possible to effectively reduce a possibility of misdetection caused by detecting an object not desired to be detected, such as a raindrop, as an object.

A detection system according to the present disclosure, it is possible to detect an object around a vehicle while reducing a possibility of misdetection caused by an effect such as a raindrop.

BRIEF DESCRIPTION OF DRAWINGS

The above and other objects, features, and advantages of the present disclosure will become more apparent from the following detailed description with reference to the accompanying drawings, in the drawings.

DESCRIPTION OF EMBODIMENTS

Figure 1:
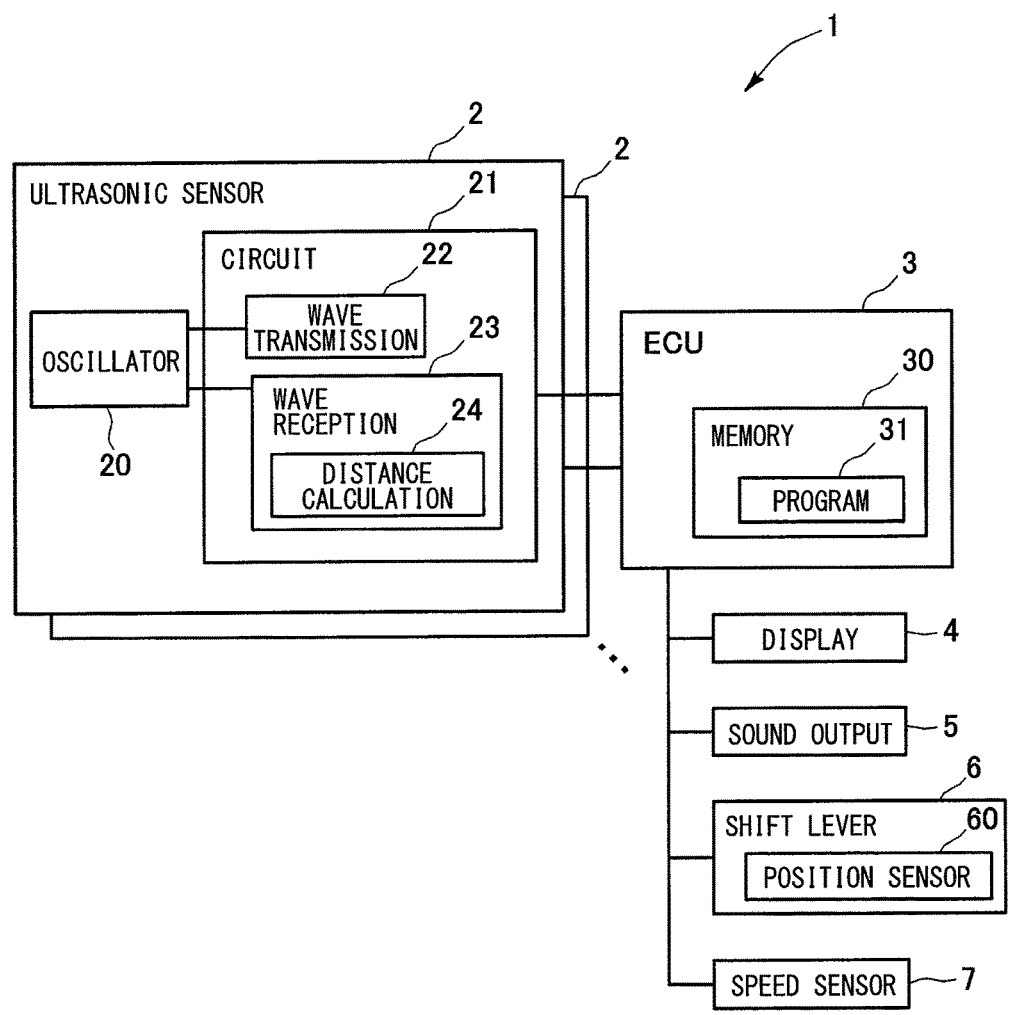
FIG. 1 is a configuration diagram of a detection system according to an embodiment.

An embodiment according to the present disclosure will be hereinafter described with reference to the drawings. FIG. 1 is a schematic view of a configuration of a detection system 1 according to the embodiment of the present disclosure. The detection system 1 is provided on a vehicle, for example, and includes an ultrasonic sensor 2, an electronic control unit (ECU) 3, a display portion 4, a sound output portion 5, a shift lever 6, and a speed sensor 7.

The ultrasonic sensor 2 (hereinafter referred to as sensor) is a sensor for detecting an obstacle around the vehicle. The sensor 2 is so structured as to perform not only a microphone function for receiving an ultrasonic wave (wave reception, detection), but also a speaker function for transmitting an ultrasonic wave (wave transmission, output). More specifically, the sensor 2 includes an oscillator 20 and a circuit unit 21. The circuit unit 21 includes a wave transmission circuit 22 that is an electronic circuit for transmitting an ultrasonic wave, and a wave reception circuit 23 that is an electronic circuit for receiving an ultrasonic wave. The oscillator 20 may be constituted by a piezoelectric ceramic oscillator, for example.

Detection of an obstacle around a vehicle, that is, detection of an object around a vehicle based on a reflected wave which is an ultrasonic wave reflected on the object, is performed as an example of the detection function. Transmission of an ultrasonic wave as a detection wave toward surroundings of a vehicle is performed as an example of the output function.

The speaker function of the sensor 2 generates an ultrasonic wave through oscillation of the oscillator 20 oscillated by an electric signal transmitted from the wave transmission circuit 22, that is, by a so-called piezoelectric effect. The microphone function generates an electric signal by piezoelectric effect through oscillation of the oscillator 20 oscillated by an ultrasonic wave reaching from the outside, and transmits the generated electric signal to the wave reception circuit 23.

The wave reception circuit 23 may include a distance calculation circuit 24, for example. The distance calculation circuit 24 is a circuit which regards a received ultrasonic wave as a reflected wave of an ultrasonic wave generated from the sensor 2 and reflected on an object (obstacle) present around the vehicle, and calculates a distance between the vehicle and the obstacle. More specifically, the distance calculation circuit 24 has a clocking function to calculate the distance to the obstacle by multiplying a required time from generation to reception of an ultrasonic wave by a speed of the ultrasonic wave, and dividing the product by two. In addition, the wave reception circuit 23 may include a filter for removing noise from the received ultrasonic wave, a waveform shaping circuit, and others.

As illustrated in FIG. 1, multiple sensors 2 may be provided on the vehicle. The multiple sensors 2 may be located on a bumper of the vehicle. For example, the sensors 2 may be disposed at two positions in left and right parts of a front bumper, and four symmetric positions in left and right parts of a rear bumper. Alternatively, only one sensor 2 may be equipped.

The electronic control unit (ECU) 3 performs overall obstacle detection processing around the vehicle. The ECU 3 includes a configuration similar to an ordinary computer, such as a CPU executing various types of calculation and information processing, a RAM that is a volatile storage unit providing a work area for the CPU, and a memory 30 that is a non-volatile storage unit storing programs and data necessary for operation executed by the CPU. The memory 30 may store a program 31 under which processing according to the present disclosure is performed.

The detection system 1 further includes the display portion 4, the sound output portion 5, the shift lever 6, and the speed sensor 7 as parts relating to the present disclosure. The display portion 4 and the sound output portion 5 configure a part associated with notification about detection of an obstacle. The display portion 4 may be configured by a display corresponding to an operation display provided inside the vehicle, for example. The display portion 4 gives notification about detection of an obstacle around the vehicle toward the interior of the vehicle by displaying characters, pictures or the like. The sound output portion 5 is a speaker or the like provided inside the vehicle, for example. The sound output portion 5 gives notification about detection of an obstacle around the vehicle toward the interior of the vehicle by emitting sound (buzzers, chimes, voices or the like).

The shift lever 6, as known, is a part operated by the driver to change a gear of a transmission of the vehicle. A current position (range) of the shift lever 6 is detected by a position sensor 60. The speed sensor 7 includes a rotation detection portion such as a rotary encoder to calculate a speed of the vehicle based on detection of rotation of a wheel (or generate information indicating the speed of the vehicle). The foregoing parts are connected to each other via in-vehicle communication lines to allow information exchange between each other.

Figure 2:
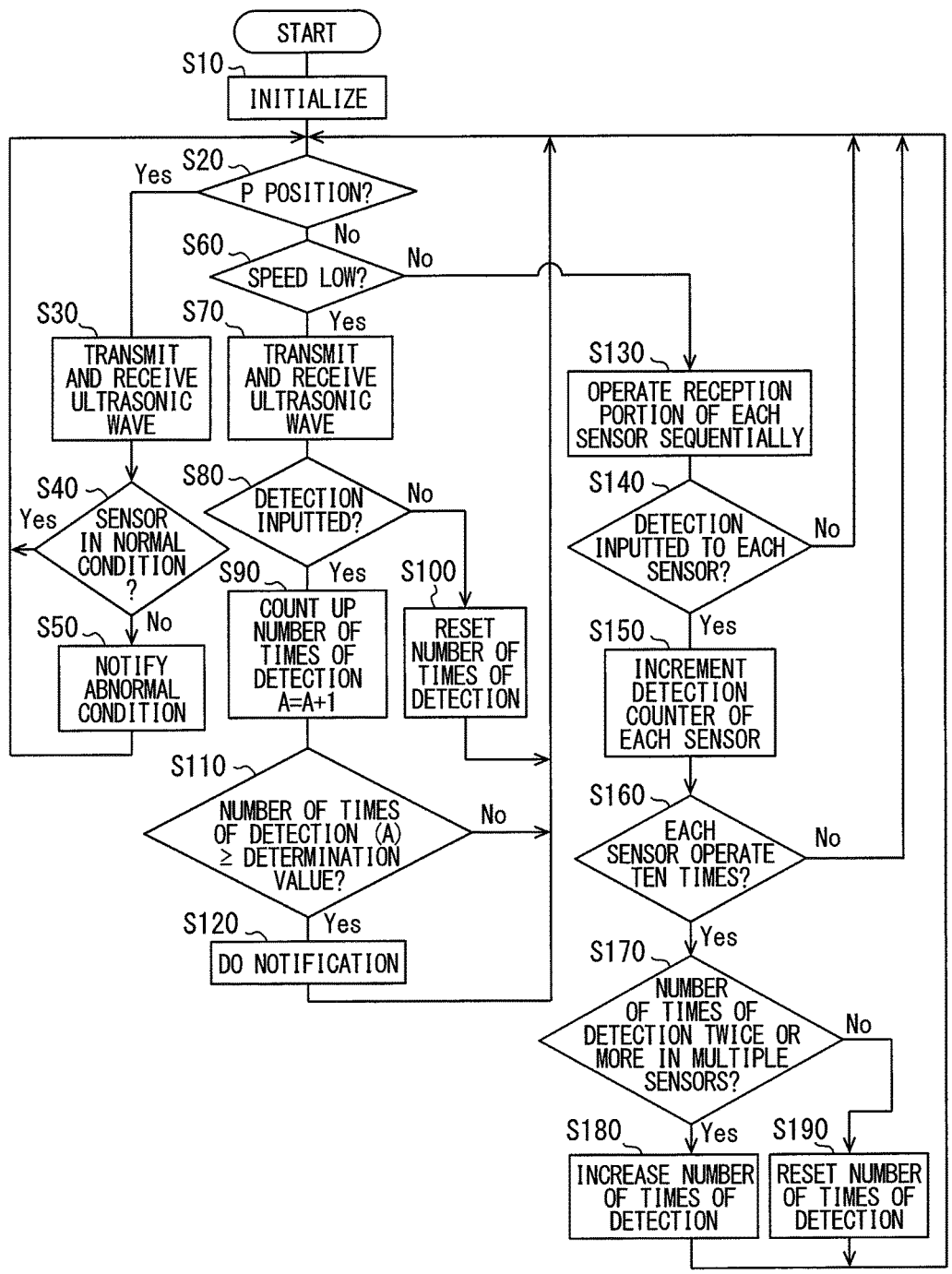
FIG. 2 is a flowchart showing an example of processing procedures.

The detection system 1 having the configuration described above executes a series of procedures of an obstacle detection process which additionally includes processing according to the present disclosure to detect an obstacle around the vehicle. FIG. 2 shows an example of the processing procedures. The processing procedures shown in FIG. 2 may be programmed beforehand, and stored in the memory 30 as the program 31 which is called and automatically executed by the ECU 3, for example.

According to the process shown in FIG. 2, the ECU 3 initially performs predetermined initializing processing in S10, and then determines whether the shift lever 6 is in a P position (parking position, parking range), based on output from the position sensor 60 in S20. When it is determined that the shift lever 6 is in the P position (S20: Yes), the flow proceeds to S30. When it is determined that the shift lever 6 is not in the P position (S20: No), the flow proceeds to S60.

When the flow proceeds to S30, the ECU 3 performs processing from S30 to S50 to execute a sensor failure detection process in a parking state. More specifically, the ECU 3 initially transmits an ultrasonic wave from the sensor 2 in S30. As described above, the sensor 2 has both the functions of transmission and reception of an ultrasonic wave. In this case, the wave reception circuit 23 also detects oscillation of the oscillator 20 during transmission of the ultrasonic wave. Oscillation of the oscillator 20 during transmission of the ultrasonic wave includes oscillation in a period of transmission of an electric signal from the wave transmission circuit 22 for wave transmission, and reverberation oscillation of the oscillator 20 after an end of that period.

The ECU 3 determines whether the entire oscillation up to determination of the end of the reverberation oscillation has been correctly detected by the wave reception circuit 23 in S40. When it is determined that the oscillation up to reverberation oscillation has been correctly detected, the ECU 3 determines that the sensor 2 is in the normal condition. When it is determined that the oscillation up to reverberation oscillation has not been detected, the ECU 3 determines that the sensor 2 is in a condition of failure as a result of freezing of the oscillator 20, disconnection at a certain position between the oscillator 20 and the ECU 3, or for other reasons.

When it is determined that the sensor 2 is in the normal condition (S40: Yes), the flow returns to S20. When it is determined that the sensor is in the condition of failure (S40: No), the flow proceeds to S50. When the flow proceeds to S50, the ECU 3 gives notification about detection of the abnormal condition of the sensor 2 toward the interior of the vehicle. This notification may be given by display on the display portion 4, sound (voice) from the sound output portion, or other methods.

When the flow proceeds to S60, the ECU 3 determines whether the speed of the vehicle is lower or higher than a predetermined speed, based on information received from the speed sensor 7. When it is determined that the speed of the vehicle is lower than the predetermined speed (S60: Yes), the flow proceeds to S70. When it is determined that the speed of the vehicle is higher than the predetermined speed (S60: No), the flow proceeds to S130. The predetermined speed set herein may be 10 km per hour, for example.

When the flow proceeds to S70, the ECU 3 executes an obstacle detection process around the vehicle for low-speed traveling based on processing from S70 to S120. On the other hand, when the flow proceeds to S130, the ECU 3 executes a rain estimation process for non-low-speed traveling as a main process of the present disclosure, and a process for reducing obstacle misdetection performed along with the rain estimation process based on processing from S130 to S190.

Initially, when the flow proceeds to S70, the ECU 3 transmits an ultrasonic wave from the sensor 2. When a reflected wave which is the ultrasonic wave transmitted and reflected on a certain obstacle, or an object such as a raindrop (hereinafter collectively referred to as ultrasonic wave or the like) reaches the sensor 2, the ECU 3 receives a signal corresponding to the ultrasonic wave or the like from the sensor 2. In this case, the ECU 3 processes in subsequent S80 only a signal corresponding to the ultrasonic wave or the like in a period after a time determined as an end of the foregoing reverberation, as a target for obstacle detection in signals received in S70. The sensor 2 having received the ultrasonic wave or the like regards the received ultrasonic wave or the like as a reflected wave reflected on and reaching from the obstacle around the vehicle, and calculates a distance to the obstacle in the manner described above. The foregoing processing of transmission, reception, and calculation is executed multiple times for all of the sensors 2 provided on the vehicle.

Subsequently, the ECU 3 determines whether detection has been input to the sensor 2 (that is, whether the sensor 2 receives a signal corresponding to the ultrasonic wave or the like) in S80. When it is determined that detection has been input (S80: Yes), the flow proceeds to S90. When it is determined that no detection has been input (S80: No), the process proceeds to S100. When the flow shifts to S90, the ECU 3 counts up the number of times of detection (variable A) by one. When the flow proceeds to S100, the ECU 3 resets the number of times of detection.

In S110, the ECU 3 subsequently determines whether the sensor 2 has detected the obstacle at the same distance a predetermined number of times (determination value) or larger. When it is determined that the number of times of detection is the predetermined number of times or larger (S110: Yes), the process proceeds to S120. When it is determined that the number of times of detection is smaller than the predetermined number of times (S110: No), the flow returns to S20 to repeat the procedures described above. The predetermined number of times in this step may be set to an appropriate number beforehand, or may be set by a user through an input unit provided on the vehicle.

When the flow proceeds to S120, the ECU 3 gives notification about the presence of the obstacle around the vehicle. More specifically, this notification may be given by display on the display portion 4, or sound (voice) from the sound output portion 5. The driver or a passenger on the vehicle is therefore appropriately notified about the presence of the obstacle around the vehicle during low-speed traveling by the processing described above. In this case, notification is given only when the presence of the obstacle is detected multiple times based on the processing in S110. More specifically, even in a state of misdetection that an object is present at a certain distance from the sensor 2 based on collision between the sensor and the object such as a raindrop, notification is given only when the object is detected multiple times at the same distance. Accordingly, misdetection of an object such as a raindrop decreases.

On the other hand, when the flow proceeds to S130, the ECU 3 executes the raindrop estimation process for non-low-speed traveling as the main process of the present disclosure, and the process for reducing obstacle misdetection performed along with the rain estimation process as described above. More specifically, the ECU 3 initially supplies power to the respective sensors 2 provided on the vehicle to operate the sensors 2 in S130. In this case, the ECU 3 does not operate parts associated with transmission of an ultrasonic wave (wave transmission circuit 22 and the like), but operates only parts associated with reception of an ultrasonic wave (wave reception circuit 23 and the like). Accordingly, only wave reception is performed without transmission of an ultrasonic wave from the sensor 2.

Subsequently, the ECU 3 determines whether detection has been input to the respective sensors 2 in S140. When it is determined detection has been input to the sensors 2 (S140: Yes), the flow proceeds to S150. When it is determined no detection has been input to the sensors 2 (S140: No), the flow returns to S20 to repeat the foregoing procedures. When the flow proceeds to S150, the ECU 3 increments a detection counter by one, the detection counter counting the number of times of detection by each of the sensors 2.

Thereafter, the ECU 3 determines whether each of the sensors 2 (wave reception circuits 23 of sensors 2) has operated ten times in S160.

When it is determined that each of the sensors 2 has not yet operated ten times (S160: No), the flow returns to S120. When it is determined that the reception part of each of the sensors has operated 10 times (S160: Yes), the flow proceeds to S170 to determine whether the multiple sensors 2 have detected the ultrasonic wave or the like twice or a larger number of times. When it is determined that the multiple sensors 2 have detected the ultrasonic or the like twice or a larger number of times (S170: Yes), the flow proceeds to S180. When it is determined that the multiple sensors 2 have not detected the ultrasonic or the like twice or a larger number of times (S170: No), the flow proceeds to S190.

As described above, no ultrasonic wave is output from the sensors 2 in S130. Accordingly, the ultrasonic wave or the like received (detected) in S130 is not a reflected wave on an obstacle around the vehicle. Reception in S130 is regarded as reception based on collision between a raindrop and the oscillator 20, for example.

Accordingly, the flow proceeds to S180 when the sensors 2 detect a raindrop or the like during non-low-speed traveling. On the other hand, the flow proceeds to S190 when the sensors 2 do not detect a raindrop or the like. Accordingly, the ECU 3 executes a process for increasing the number of times of detection determination (determination value in S110) in S180. In this case, even in a state that the number of times of detection in S80 may contain the number of detection of an object such as a raindrop during raining, detection of an obstacle is determined only when the object is detected a relatively large number of times during raining based on processing in S180. Accordingly, misdetection of an obstacle during raining decreases.

On the other hand, when the flow proceeds to S190, the ECU 3 performs a process for resetting the number of times of detection determination (returning the number of times to a default value). In this case, the number of times of detection determination returns to a default value appropriate for a non-raining state in S190 after a stop of raining even when the number of times of detection determination is increased in S180 based on detection of a raindrop during traveling of the vehicle. Accordingly, this step prevents such a situation that an object is difficult to detect after a stop of raining as a result of increment of the number of times of detection determination. After completion of processing in S180 or S190, the ECU 3 returns to S20 to repeat the foregoing procedures.

Description of the processing procedures shown in FIG. 2 has been made. The procedures described above increase the number of times of detection determination at the time of detection of a raindrop or the like achieved by effective utilization of the non-low-speed traveling state. Accordingly, misdetection of an obstacle caused by an effect of a raindrop or the like decreases. Moreover, the number of times of detection determination automatically returns to a value corresponding to a non-raining state after a stop of raining. Furthermore, detection of a raindrop or the like during low-speed traveling is achievable by effective utilization of the non-low-speed traveling state prior to obstacle detection based on the determination process in S60, for example. The possibility of misdetection detecting a raindrop or the like becomes lower by the determination process in S170 described above in comparison with determination of a raindrop based on detection only once by one sensor, for example.

While detection of a raindrop is described herein, the raindrop may include a snowflake, a hailstone, a drop of sleet and the like, and further include all phenomena detectable by the sensor 2. In addition, while the determination process in S170 in FIG. 2 executes a binary determination of whether the current state is a raining state or a non-raining state, the process in S170 may be switched to a process including determination of intensity of raining. For realizing this process, the process in S180 may be switched to such a process which increases the number of times of detection determination as the number of times of detection by all the sensors becomes larger. In this case, the possibility of misdetection of an obstacle further decreases in a state of heavy rain as a result of a rise of the number of times of detection determination.

A detection system according to one aspect of the present disclosure includes: a detection portion that has an output function for outputting a detection wave toward surroundings of a vehicle, and a detection function for detecting an object around the vehicle based on a reflected wave which is the detection wave reflected on the object; a determination section that determines that the object is definitely present around the vehicle when a number of times of detection of the object by the detection function of the detection portion exceeds a predetermined number of times; a control section that causes operation of the detection function of the detection portion without operation of the output function of the detection portion when the vehicle travels at a predetermined speed or higher; and an adjustment section that increases the predetermined number of times designated for the determination section when the object is detected by the detection function operated by the control section during traveling of the vehicle at the predetermined speed or higher.

The detection system according to the present disclosure increases the predetermined number of times designated for object detection determination around the vehicle when the detection function of the detection portion allowed to operate detects a raindrop or the like as an object during traveling of the vehicle at the predetermined speed or higher. The detection system therefore effectively reduces a possibility of misdetection caused by detecting an object not desired to be detected, such as a raindrop, as an object.

The foregoing embodiment may be modified in an appropriate manner within the scope of the disclosure described herein. For example, while the ultrasonic sensor has been employed in the foregoing embodiment, the present disclosure is not limited to the configuration provided with the ultrasonic sensor. The present disclosure is also applicable to any types of detection portions capable of detecting both an object around a vehicle and an object such as a raindrop. In addition, while the single ECU 3 executes the process shown in FIG. 2 in the foregoing description, multiple CPUs may be equipped to allow each of the CPUs to individually execute a part of the process shown in FIG. 2.

It is noted that a flowchart or the processing of the flowchart in the present application includes sections (also referred to as steps), each of which is represented, for instance, as S10. Further, each section can be divided into several sub-sections while several sections can be combined into a single section.

While various embodiments, configurations, and aspects of the detection system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A detection system comprising:
   a detector that has an output function outputting a detection wave toward surroundings of a vehicle, and a detection function detecting an object around the vehicle based on a detection input including a reflected wave which is the detection wave reflected on the object; and
   a controller that is configured to include
      a determination section that determines that the object is definitely present around the vehicle when the detection function of the detector detects the detection input at a predetermined number of times or more;
      a control section that causes a detection function of the detector to be operated without operation of the output function of the detector when the vehicle travels at a predetermined speed or higher, and
      an adjustment section that increases the predetermined number of times when the controller causes the detection function of the detector to be operated without operation of the output function and also when the detection function receives the detection input during traveling of the vehicle at the predetermined speed or higher.

2. The detection system according to claim 1, wherein:
   the controller is configured to include
      a sub adjustment section that decreases the predetermined number of times when the controller causes the detection function of the detector to be operated without operation of the output function and also when the detection function does not receives the detection input, after the adjustment section has increased the predetermined number of times.

3. The detection system according to claim 1, wherein:
   the determination section determines that the object is definitely present around the vehicle when the number of times of detection of the object by the detection function of the detection portion exceeds a predetermined number of times during traveling of the vehicle at a speed lower than the predetermined speed.

4. The detection system according to claim 1, wherein:
an adjustment section increases the predetermined number of times to a first increased number of times, when the controller causes the detection function of the detector to be operated without operation of the output function and also when the detection function receives the detection input during traveling of the vehicle at the predetermined speed or higher; and
the adjustment section increases the predetermined number of times to a second increased number of times, which is greater than a first increased number of times, as the detection function receives the detection input greater when the controller causes the detection function of the detector to be operated without operation of the output function.

5. The detection system according to claim 1, wherein:
the detection wave is provided by an ultrasonic wave.

\* \* \* \* \*